(No Model.)
T. J. HART.
COMBINED INJECTOR AND EJECTOR.
No. 314,446. Patented Mar. 24, 1885.
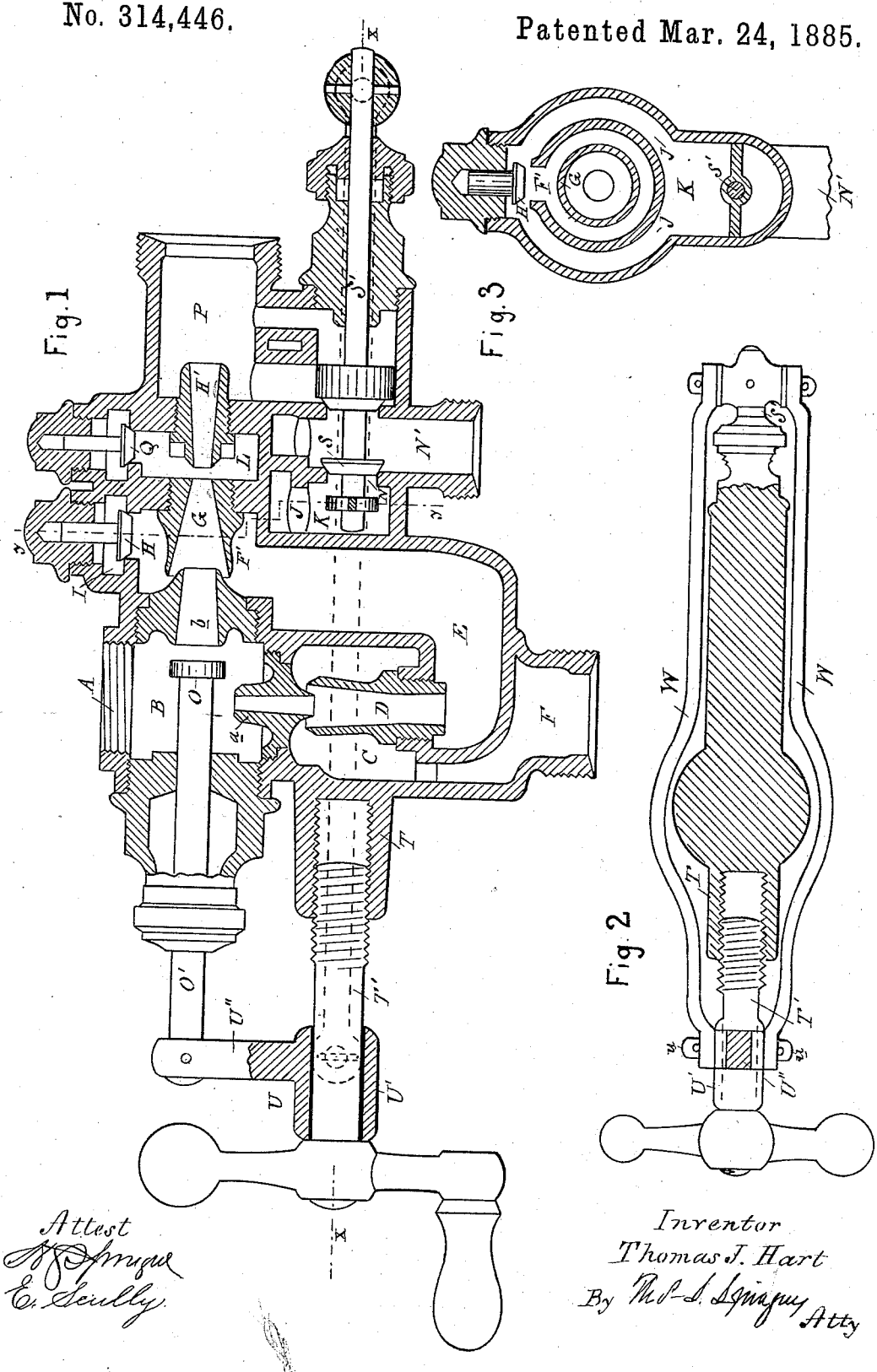
Attest
J. J. Sprague
E. Scully
Inventor
Thomas J. Hart
By Thos. S. Sprague
Atty
N. PETERS, Photo-Lithographer, Washington, D. C.

UNITED STATES PATENT OFFICE.

THOMAS J. HART, OF DETROIT, MICHIGAN, ASSIGNOR TO JAMES JENKS, OF SAME PLACE.

COMBINED INJECTOR AND EJECTOR.

SPECIFICATION forming part of Letters Patent No. 314,446, dated March 24, 1885.

Application filed June 4, 1884. (No model.)

*To all whom it may concern:*

Be it known that I, THOMAS J. HART, of Detroit, in the county of Wayne and State of Michigan, have invented new and useful Improvements in Combined Injector and Ejector; and I do hereby declare that the following is a full, clear, and exact description thereof, reference being had to the accompanying drawings, which form a part of this specification.

This invention relates to certain new and useful improvements in that class of injectors which combine in one instrument an injector or lifting mechanism and an ejector or forcing mechanism, the former adapted to raise water from a lower level and deliver the water thus raised to the latter, which is adapted to force such water into the boiler against the steam-pressure therein.

For the practical operation in producing the best results of such implements it is essential that a valve should be employed adapted, as manipulated, to cut off steam from or admit it to the forcing portion of the device. It is also necessary that an overflow or water passage, also furnished with a valve, be provided, by means of which air and surplus water may be discharged to the atmosphere; and, in the starting of such an implement, it is necessary that the valve controlling the admission of steam to the forcing mechanism be closed, while the valve controlling the overflow should be open, and after the air is expelled from the implement and the lifting mechanism has filled the chamber or chambers of the forcing mechanism that the steam-valve be opened and the overflow-valve closed. This has heretofore been done by providing both such valves with stems projecting through the walls of the implement, each of said stems having a proper handle, by means of which they can be separately operated; and it is the object of my invention to so connect the stems of said valves together in such a manner that the position of one will always govern the position of the other by one manipulation—that is to say, when the steam-valve is opened the overflow-valve is closed, and when the former is closed the latter will be opened.

Figure 1 is a vertical central section of my improvement attached to a combined injector and ejector. Fig. 2 is a plan of the same. Fig. 3 is a cross-section on the line $yy$ in Fig. 1.

As I have not invented any ejector or injector, single or combined, I will not give a detailed description of their construction and operation, but will name the several parts to show how my invention is applied and operated. Neither do I wish to confine the application of my improvement to an implement constructed like the one shown in the drawings, as my invention is equally applicable to any such implement where the stem of the steam-inlet valve and of the overflow-valve, respectively, project through the walls of the device at opposite ends or sides thereof.

In the accompanying drawings, which form a part of this specification, A is the steam-inlet from the boiler to the chamber B. C is a chamber connecting the water-inlet F, and D a combining-tube, affording the only communication between the chamber C and the conduit E, which leads to a chamber, F', which incloses the combining-tube G. A steam-jet, $a$, admits steam from the chamber B to the lifting portion of the implement, and another steam-jet, $b$, performs a like office to the forcing side of the device, the entrance to the latter-named jet being controlled by the valve O, the stem O' of which projects through the wall of the steam-chamber B. A port provided with an automatically-operating valve, H, affords communication between the chambers F' and I, and the latter communicates with the chamber K by means of the passages J, and this chamber K communicates with the overflow N' to the atmosphere by means of a port, N, which is provided with a valve, S, the stem S' of which projects through the wall of the device, as shown.

L is a chamber surrounding the delivery-tube H', and has communication with the chamber F' through the combining-tube G.

Q is an automatically-operating valve controlling a port leading from the chamber L to the overflow N'.

P is a chamber or pipe leading to the boiler, and communicates with the chamber L through the delivery-tube H'.

This particular form of injector is not my invention, but is the invention of James Jenks, of Detroit, Michigan, and I use it simply to show an operative device with my improvement attached thereto, although it may be attached to any other construction wherein are employed a steam and an overflow valve situated with relation to each other substantially as above described.

Integral with the shell of the implement, or otherwise attached to it, is an internally-threaded socket, T, independent and distinct from the steam-passages of the device, said socket or chamber being adapted to engage with a leading-screw thread on the stem T', which passes through the sleeve U' of the yoke U, sleeved on such stem and secured thereon in such manner as to follow the projection or retraction of such stem without interfering with its free rotation. One side of this sleeve U' is connected to the projecting end of the stem O' by the arm U'', extending from one side thereof, so that the position of the valve O upon its inclosed end will be determined by the projection or retraction of the stem T'. To the arms $u$, which extend from either side of the sleeve U' at right angles to the arm U'', are secured the rods W, which run along the device, one on each side, with their ends secured to the projecting end of the stem S'.

From this construction it will readily be seen that by a movement of the stem T' in either direction a perfect operation of the two valves O and S is simultaneously attained.

What I claim as my invention is—

1. In a combined ejector and injector provided with a valve for the admission of steam to the steam-nozzle of the ejector, and with an overflow or waste valve, the stem of both said valves projecting through the walls of the device, one at either end thereof, said valves being on the same vertical plane, but each arranged on one side of the center of the other, as shown, the threaded projection T, integral with the casing, in combination with the threaded stem T', yoke U, and rods W, constructed and arranged substantially as described, by means of which said steam and waste valves are connected and simultaneously operated in opposite directions as relates to their respective seats, substantially as and for the purposes specified.

2. In combination with a combined injector and ejector having a steam-valve to control the admission of steam to the jet of the ejector, and a waste-valve, a supplemental screw-stem, T', arranged at one side of said steam-valve, and yoke U, sleeved on said stem and reciprocating therewith, the arm U'' of which connects directly with said steam-valve stem by means of the rods W, substantially as and for the purposes set forth.

THOMAS JAS. HART.

Witnesses:
H. S. SPRAGUE,
CHARLES J. HUNT.